United States Patent Office 3,520,211
Patented July 14, 1970

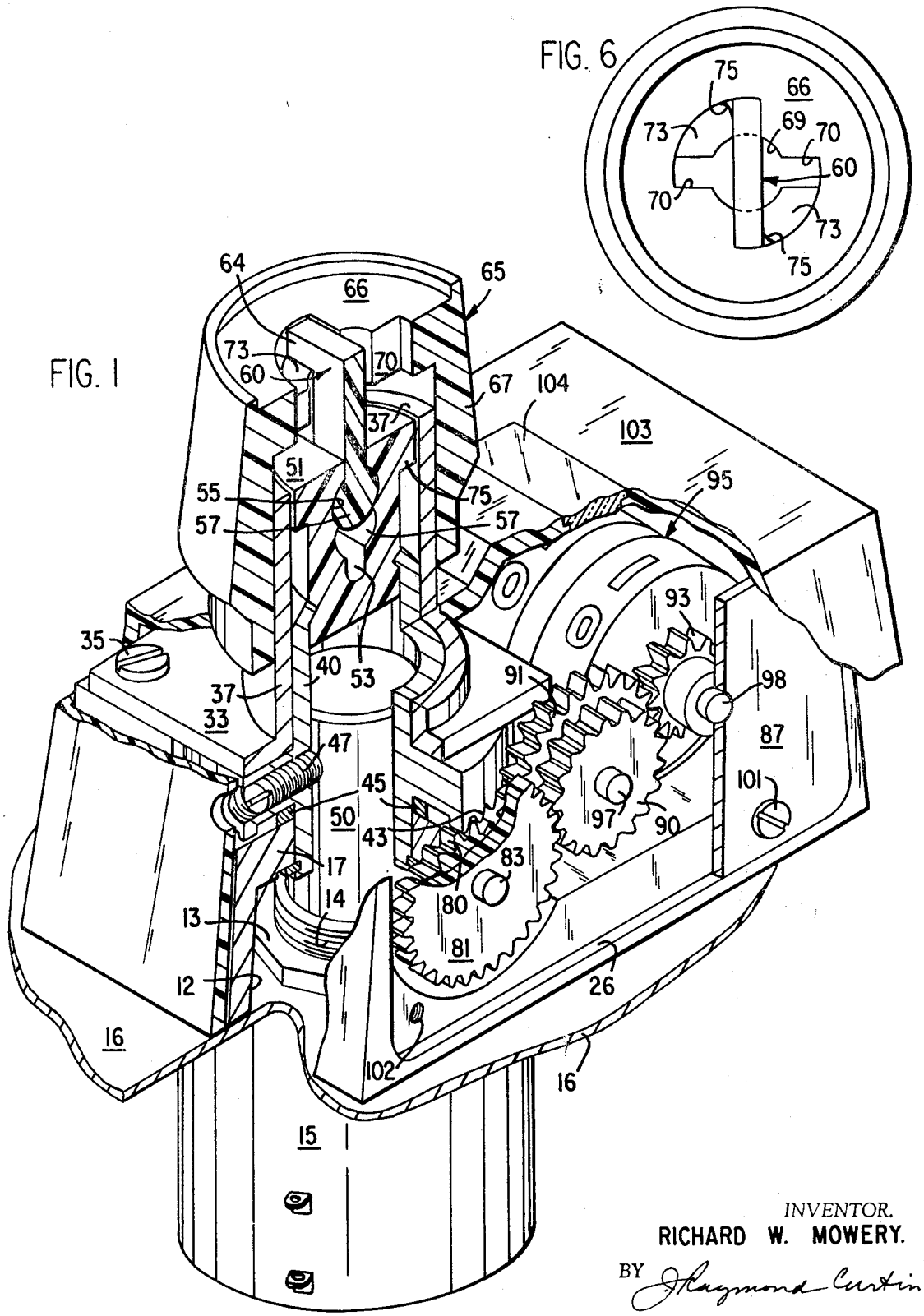

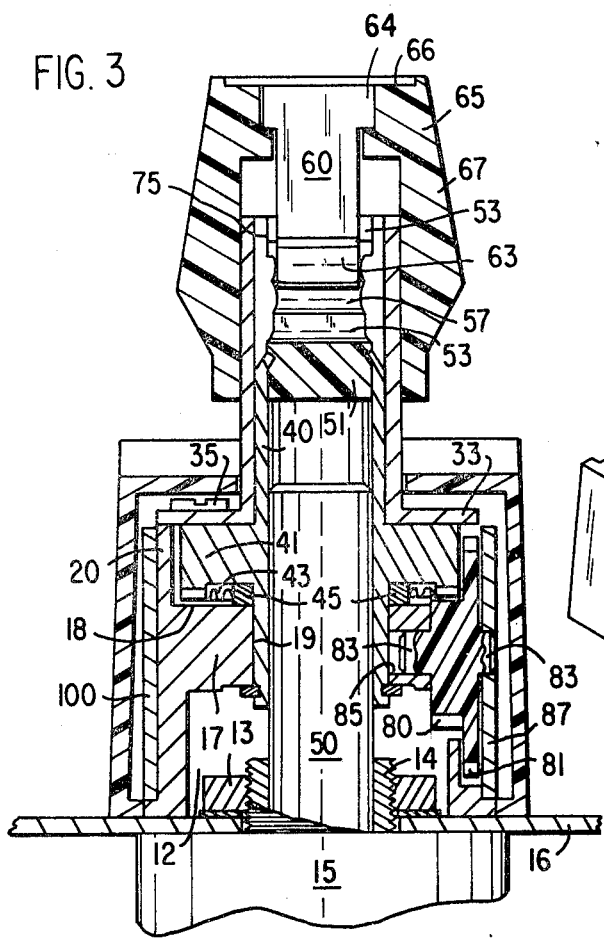
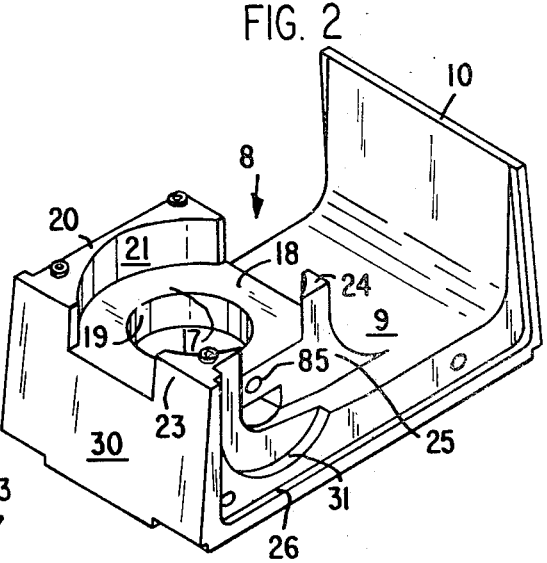
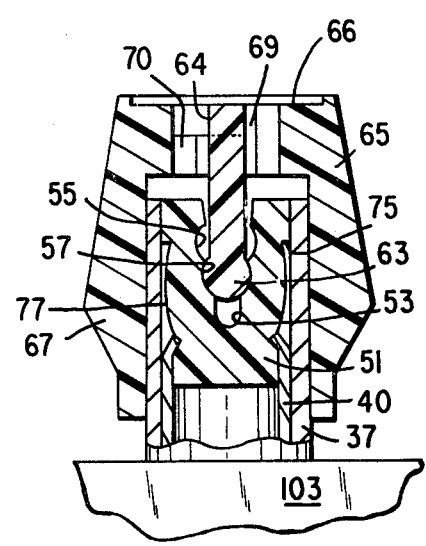
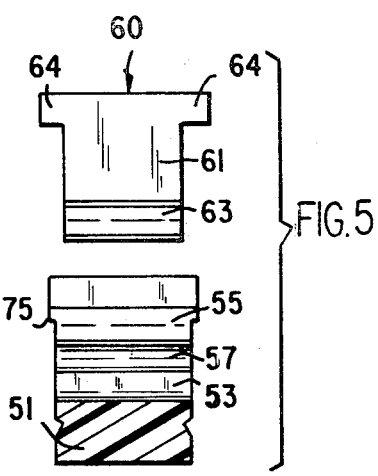

3,520,211
MECHANISM FOR ROTATABLY ADJUSTING A SHAFT
Richard W. Mowery, Downey, Calif., assignor to Carrier Corporation, Syracuse, N.Y., a corporation of Delaware
Filed Sept. 30, 1968, Ser. No. 763,875
Int. Cl. G05g 5/22
U.S. Cl. 74—531              4 Claims

ABSTRACT OF THE DISCLOSURE

Mechanism for rotatably adjusting a shaft, such as a potentiometer shaft, and locking the shaft in adjusted position. A body is provided with a cylindrical bore in which is mounted a cylindrical coupling connected at its inner end to the shaft. The outer end of the coupling is bifurcated. An actuator is positioned in the outer bifurcated end of the coupling and is operable upon inward movement to spread the leg portions of the bifurcated end into engagement with the bore to lock the shaft in adjusted position. A rotation indicator may be mounted in the body and connected to the coupling through a gear train. The body is provided with a removable side plate to permit gears in the gear train to be conveniently interchanged, or other gears substituted, to vary the ratio between the coupling and the position indicator.

BACKGROUND OF THE INVENTION

A number of arrangements have been developed to provide for the manual rotation of shafts, such as potentiometer shafts, and such arrangements have incorporated means for locking the shaft in adjusted position. In some such arrangements, the operation of the locking mechanism is difficult to operate without effecting movement of the shaft. In most such arrangements, the mechanism embodies a myriad of small parts, resulting in high manufacturing and assembling costs.

SUMMARY OF THE INVENTION

The mechanism of my invention embodies a very simple structure consisting only of a coupling attached to the shaft and an actuator mounted in the coupling and operable upon inward movement to lock the coupling in the body, or housing, in which it is journalled. The parts making up the mechanism may be manufactured and assembled at very low cost and yet the structure is exceedingly rugged and free from maintenance over extended periods of time. The body of the mechanism also includes a position indicator in the form of a digital dial mechanism operated by rotation of the coupling through a gear train, the entire assembly being enclosed by a dust tight cover.

BRIEF DESCRIPTION OF THE DRAWINGS

FIG. 1 is a view in perspective with portions in section, and portions broken away, of a rotary shaft adjusting mechanism illustrating my invention;
FIG. 2 is a view in perspective of the body casting;
FIG. 3 is a view of the mechanism shown in FIG. 1 with the coupling and actuator turned 90° from the showing in FIG. 1;
FIG. 4 is a vertical sectional view of the structure shown in the upper portion of FIG. 1, illustrating the coupling in expanded braking position;
FIG. 5 is an exploded view of the upper portion of the coupling and the actuator; and
FIG. 6 is a top plan view of the actuator positioned in the knob.

DESCRIPTION OF THE PREFERRED EMBODIMENT

The adjusting mechanism consists of a frame or body member 8 having a rectangular base 9 with an upstanding end wall 10. A substantial portion of the base is formed with a raised area spaced from the end wall 10. The lower portion of this raised area is formed with an enlarged counterbore 12 to provide a recess for the reception of a jam nut 13 threaded on threaded bushing 14 of a potentiometer 15. The nut 13 serves to affix the potentiometer 15 to the under side of a mounting panel 16.

The wall 17 above the counterbore 12 presents a surface 18, the top wall 17 being formed with a circular aperture 19, see FIG. 2. The raised portion includes a side wall 20 extending upwardly from the surface 18 and having an inner arcuate surface 21 concentric with the aperture 19. The raised portion is also formed with post portions 23, 24, extending upwardly from the surface 18, and also formed with inner arcuate surface. The side wall 25 of the raised portion, opposite the side wall 20 is spaced inwardly from the contiguous edge of the base 9. The base 9 is formed with a rabbet 26 extending along each side edge thereof and upwardly along the edges of the end wall 10, and the side edges of the opposite end wall 30 formed by the raised portion. Also, the base 9 is formed with a recess having a curved bottom wall 31 extending from the top surface of the base and merging with the wall 30.

A plate 33 of rectangular form is mounted on the top surfaces of the side wall 20 and the post portions 23, 24, and is affixed thereto, as by screws 35. The plate 33 is formed with an upwardly extending cylindrical sleeve 37, see FIGS. 1 and 3. The plate 33 is fixed to the upstanding portion of the base in such manner that the sleeve 37 is positioned concentrically with the aperture 19. A coupling member is journalled for rotataion in the sleeve 37 and the aperture 19. Preferably, this coupling is of two-piece construction having a lower metallic sleeve portion 40 provided intermediate its ends with a radial flange 41 which is positioned intermediate the plate 33 and the surface 18 of the body. The lower portion of the sleeve 40 is journalled in the aperture 19. The flange 41 is provided with a crown gear 43 which is fixed to the underside of the flange 41 and, in the arrangement shown, a spacer 45 is positioned concentrically within the gear and serves to prevent the depending teeth of the gear from rubbing on the surface 18. The flange 41 is formed with a radially disposed threaded aperture to receive a set screw 47 by which the coupling is affixed to the potentiometer shaft 50. The coupling includes an upper or outer portion 51 formed of resilient material, such as plastic, and which is fixedly secured to, and interlocked with, the sleeve 40 by the upper or outer end of the sleeve 40 being crimped onto the inner end of the member 51.

The outer portion of the member 51 is bifurcated by way of a slot extending inwardly from the major portion of the length of the member. The outer and inner portions of the slot are indicated at 53. The member 51 is also formed with transversely extending apertures 55, 57, these apertures being aligned with, and extending through, the slot 53. The apertures are shown as of circular form having a diameter exceeding the width of the slot 53. The outer aperture 55 is somewhat larger in diameter than the inner aperture 57.

An actuator 60 is formed with a body portion 61 rectangular in cross section and dimensioned for axial sliding movement in the slot 53. The inner end of the member 60 is formed with an enlarged transversely extending portion 63 of bulbous form, dimensioned comparable to the upper aperture 55. At its outer end, the member 60 is formed with laterally extending portions 64. The member 60 is of such length that when the enlarged end portion 63 is positioned in the aperture 55, the member extends an appreciable distance outwardly from the outer end of the member 51, providing an actuator by means of which the coupling assembly can be conveniently rotated in the sleeve 37, and such rotation is imparted to the potentiometer shaft 50 as will be apparent.

Preferably, the actuator 60 is provided with an operating knob 65 having a discoidal end wall 66, and an elongated depending circular skirt 67 encircling the sleeve 37. The end wall 66 of the knob is formed, in the central portion thereof, with a circular aperture 69 and with slots 70 extending radially from the aperture 69. The diameter of the aperture 69 is comparable to the width of the body 61 of the member 60, and the slots 70 are dimensioned to permit the outer T-shaped end of the actuating member to pass through the end wall 66 of the knob when the same is sleeved downwardly over the sleeve 37.

The end wall 66 of the knob is formed with arcuate surfaces 73 located downwardly from the outer or upper surface of the end wall 66. The surfaces 73 are approximately 90° in arcuate or circumferential length. When the knob 65 has been moved downwardly over the actuator 60 to position the radial portion 64 thereof above the arcuate surfaces 73, the knob is rotated in a counter-clockwise direction, FIG. 6, until the projections 64 abut against the end walls of the surfaces 73. The portions 64 are fixedly secured to the knob by adhesive, as indicated at 75, FIG. 6. However, the actuator may be fixed to the knob by any other suitable arrangement.

With the enlarged end portion 63 of the actuator positioned in the outer aperture 55, the lower edge of the skirt 67 of knob 65 is located a distance above the plate 33. With the actuator in this position, the coupling and shaft 50 can be rotated by the knob.

If the knob and the actuator are pressed inwardly, as shown in FIG. 4, to position the enlarged end portion 63 in the aperture 57, the outer portion of the member 51 will be expanded outwardly into locking engagement with sleeve 37. This, because the inner aperture 57 is of less width, or diameter, than the aperture 55.

It will be noted that the outer end portion 75 of the member 51 is somewhat larger in diameter than the remainder of the member. As previously stated, the member 51 is formed of resilient material. Accordingly, when the enlarged portion 63 is moved into the aperture 57, with the upper end portion 75 engaging the sleeve 37, the intermediate area of the member 51 is expanded, as indicated by the curved surface at 77, FIG. 4. With this arrangement, the actuator and the coupling are formed with coacting portions operable upon inward movement of the actuator to expand the coupling into braking engagement with the body sleeve 37.

It is conventional practice to incorporate in adjusting mechanisms for precision potentiometers, a rotation indicator as a digital dial mechanism. The teeth of the crown gear 43 mesh with a pinion gear 80 formed integral with, or fixedly connected to, a spur gear 81, see FIG. 3. These gears are provided with trunnions 83, one of which is journalled in an aperture 85, FIG. 2, formed in the wall 25 of the raised portion of the base, and the other trunnion is journalled in a side plate 87. The gear 81 is arranged in mesh with a gear 90 connected to a gear 91 which, in turn, is arranged in mesh with a pinion 93 operatively connected to the digital dial indicator 95. The gears 90, 91, and the dial indicator are mounted on shafts 97, 98, like ends of which are journalled in the plate 87, and the opposite ends in a similar plate 100, see FIG. 3. These side plates are positioned in the rabbets 26 and fixed to the base by screws 101, threading into apertures 102. This gear train effects a considerable step up ratio between the shaft 50 and the shaft 98 of the counter.

A cover 103, in the form of an inverted box, is placed on the body structure of the mechanism and is provided with a transparent window 104 through which the numbers on the digital counter wheels may be viewed.

It will be apparent that the structure of my shaft adjusting mechanism embodies few parts which are conveniently assembled. Upon adjustment of the shaft 50, the actuator 60 can be pressed inwardly without effecting any rotary movement of the shaft and when pressed in, the shaft is fixedly locked against rotation.

While I have described a preferred embodiment of my invention, it will be understood the invention is not limited thereto since it may be otherwise embodied within the scope of the following claims.

I claim:

1. Mechanism for rotatably adjusting a shaft and locking the same in adjusted position comprising a body formed with a cylindrical bore, a coupling journalled in said bore and being restrained against axial movement therein, said coupling being fixedly connected at its inner end to said shaft, the outer end portion of said coupling being formed with an inwardly extending slot forming spaced-apart side portions, an actuator for rotating said shaft and having a portion extending into said slot and being axially movable therein, said actuator being cooperable with said coupling upon axial inward movement of said actuator from normal position to locking position to expand said side portions into engagement with said bore.

2. Mechanism as set forth in claim 1, wherein said bore is formed in a sleeve extending outwardly from said body, an operating knob fixed to the outer end of said actuator and having a skirt portion encircling said sleeve.

3. Mechanism as set forth in claim 1, wherein said coupling is formed with outer and inner transversely extending apertures, said apertures extending through said slot, the inner end of said actuator being formed with an enlarged portion dimensioned comparable to said outer aperture and larger than said inner aperture whereby, upon inward movement of said end portion into said inner aperture, said side portions are expanded radially into engagement with said bore.

4. Mechanism as set forth in claim 1, and including a digital dial indicator mounted in said body and being operatively connected to said coupling by a gear train, said gear train including a crown gear fixed to said coupling.

References Cited

UNITED STATES PATENTS 2,483,779   10/1949  Mucher.
2,509,058    5/1950  Haury _____ 74—531 X
2,881,867    4/1959  Mayon _____ 74—504 X MILTON KAUFMAN, Primary Examiner.

U.S. Cl. X.R.

74—504, 553; 116—115; 188—78